United States Patent Office 3,056,685
Patented Oct. 2, 1962

3,056,685
CERAMIC PRODUCT AND METHOD OF
MAKING SAME
Walter V. Goeddel, San Diego, Calif., assignor to General
Dynamics Corporation, New York, N.Y., a corporation
of Delaware
No Drawing. Filed June 8, 1959, Ser. No. 818,552
12 Claims. (Cl. 106—65)

The present invention generally relates to ceramics and more particularly relates to an improved method of making high temperature ceramics and the products thereof.

High temperature ceramic products capable of withstanding temperatures of up to 900° C. or more are becoming important for use in a wide variety of applications, for example, in the field of plasma physics, for electrical discharge tubes, insulators, tool kits, pyrometer-protection tubes and the like. In some applications, it is desirable not only for the ceramic products to be structurally stable, thermally shock resistant and chemically inert, but also to be of relatively low porosity to the penetration therethrough of fluids at relatively high temperature. Furthermore, in certain applications it is of considerable importance if the ceramic products can be fabricated to within relatively small size tolerances without necessitating the use of elaborate processing steps.

Difficulties have been encountered in providing high temperature ceramic products with the described features and in a relatively simple low-cost manner. Conventional ceramic-making procedures such as extrusion or casting of ceramic slips from silica, alumina, etc., at room temperature, followed by firing at from about 1600° C. and about 1900° C., depending on the constituents, usually cannot produce finished ceramic products within desired degrees of dimensional tolerances.

A low-cost simple method of fabrication has now been discovered. In the present method, durable, relatively non-porous high temperature ceramic products can be provided within relatively small dimensional tolerances and at relatively low temperatures, utilizing readily available materials and equipment. In accordance with the method of the present invention, low temperature sintering is carried out on selected mixtures of ceramic constituents to provide the desired results.

Accordingly, the principal object of the present invention is to provide an improved method of fabricating high temperature ceramics and the products thereof. It is a further object of the present invention to provide an improved method for the manufacture of durable, high temperature, low porosity ceramics within relatively small dimensional tolerances. It is also an object of the present invention to provide a simple, low-cost, low temperature fabricating method for the production of dimensionally stable, relatively non-porous, high temperature ceramic products.

Further objects and advantages of the present invention will be apparent from a study of the following detailed description.

The method of the present invention generally comprises a relatively low temperature sintering and hot pressing procedure, utilizing alumina and a special sintering aid. More particularly, hot pressing is carried out at low sintering temperatures utilizing a specified mixture of alumina particles and lithium borate particles. The ceramic product obtained thereby is of uniform size and shape and of greatly reduced porosity. Moreover, the method of the present invention has the important advantage for plasma physics applications in that the ceramic constituents utilized therein are of relatively low atomic number. Accordingly, energy losses due to excitation of atoms thereof in contact with the plasma will be less than in the case where ceramic constituents of higher atomic number, such as silicon, magnesium, calcium and the like, are utilized. In such latter cases, considerable quenching may be encountered.

In carrying out the method of the present invention, the ceramic constituents are first mixed together. Any relatively pure commercially available alumina may be utilized. Alumina is aluminum oxide of the formula $Al_2O_3$, and has a molecular weight of about 102 and a very high melting point. The alumina is preferably in the form of fused crushed powder of relatively small mesh size, of the order of about 200 mesh or the like.

The lithium borate utilized may be any suitable relatively pure commercially available lithium borate. In this connection, it may be lithium metaborate or lithium tetraborate. Lithium metaborate has the formula $LiBO_2$, with a molecular weight of about 50 and a melting point of about 840°–845° C. A highly hydrated form of lithium metaborate has the formula $LiBO_2.8H_2O$, a molecular weight of about 194 and a melting point of about 47° C. A less hydrated form is lithium metaborate dihydrate which has the formula $LiBO_2.2H_2O$ and the melting point of the anhydrous form. It is preferred to utilize lithium metaborate in the anhydrous form in the method of the present invention.

Lithium tetraborate has the formula $Li_2B_4O_7.5H_2O$ and a molecular weight of about 259.

Whether lithium metaborate or lithium tetraborate is utilized, it is preferred that that compound be in the form of particles of relatively small mesh size, for example, about 200 mesh. When a hydrated form of lithium borate is utilized, it is preferred to first dehydrate it, as by raising it to its melting point, quenching it and then grinding it to powder to form a "fritted" material which is a superior binder. Other equivalent means of dehydration as are conventional in the art may be employed.

The lithium borate powder is mixed with the alumina powder in a quantity to provide a concentration of lithium borate, calculated as $LiBO_2$, of between about 1 and about 20 percent by weight of the mixture, the remainder of the mixture comprising the alumina. It has been found that when a smaller concentration of lithium borate than about 1 percent by weight is employed in the mixture, the finished ceramic products tend to be relatively chalky and brittle. Accordingly, their durability is decreased so that they are undesirable. When the concentration of lithium borate in the mixture is more than about 20 percent by weight, the finished ceramic products tend to be glassy in appearance and lack the desired high temperature durability and stability. Accordingly, they are also undesirable. For most purposes, it is preferred to utilize a mixture comprising about 95 percent by weight of alumina and 5 percent by weight of lithium borate, calculated as $LiBO_2$.

After the lithium borate and alumina are mixed together, they are hot pressed. The hot pressing step can be carried out in any suitable equipment. For example, the hot pressing can be carried out in graphite dies to provide a dimensionally accurate ceramic product. In the event that graphite dies are utilized, after the hot pressing and removal of the ceramic product from the dies, it is usually advisable to abrade, as by grinding, etc., the outer surface of the ceramic product to remove therefrom adhering graphite.

An improvement comprises the use of graphite dies employing boron nitride (BN) liners. It has been found that the hot pressed ceramic products prepared from compositions containing concentrations of lithium borate $(LiBO)_2$ up to and including 10 percent by weight cleanly separate from and do not stick to the boron nitride liners, nor do particles of the lines become deposited on the outer surface of the ceramic product. Accordingly, the described abrading step can be eliminated. However, mixtures containing 20 percent or more lithium borate ($LiBO_2$) adhere firmly to boron nitride. Hot pressing can therefore be carried out with boron nitride liners in the graphite dies where lithium borate ($LiBO_2$) is present in an amount of not more than about 10 percent by weight.

Boron nitride is commercially available in the form of rods, etc. The rods may be suitably machined in the fabrication of the described boron nitride liners. The liners may also be prepared by hot pressing from carborundum dies or the like under suitable conditions.

Regardless of the particular type of equipment utilized, hot pressing is carried out on the mixture at low sintering temperatures, that is, below the melting point of the mixture, to form and shape the mixture into the desired unitary structure. The hot pressing can be carried out at any suitable low sintering temperature, for example, between about 750° C. and about 1000° C., preferably between about 800° C. and about 900° C., and at any suitable pressure up to 10,000 p.s.i. or more, for example, 3000 to 4000 p.s.i. The sintering temperature will somewhat depend upon the relative proportions of constituents in the mixture and the operating pressure, as well as other factors. The operating pressure will somewhat depend on the permissible porosity of the ceramic product, the sintering temperature, the relative proportions of constituents, etc.

In order to prevent undesired reactions between impurities present in the pressing area and the atmosphere during the hot pressing step, inasmuch as a reaction-facilitating temperature is utilized during such step, and in order to avoid reaction of the graphite dies and other graphite equipment, if any, the hot pressing is carried out in the presence of a controlled atmosphere, that is, in a substantial vacuum or in the presence of an inert atmosphere, for example, argon, krypton, helium, nitrogen, etc. Since the mixture to be hot pressed is preferably in relatively fine powder form, in many instances it is more convenient to flush the mixture and the pressing area with the inert gas, rather than attempting to apply a vacuum thereto.

The hot pressing is continued until the desired results are obtained. The operating time will necessarily vary, depending upon the operating temperature, pressure, the particular mixture utilized, the size and shape of the part being prepared and the results desired. However, in most instances where hot pressing of a relatively small ceramic object, such as a tube of 3 inch diameter or less, is carried out in graphite dies at up to about 850° C. and up to about 4000 p.s.i., the total hot pressing time may be of the order of about 15 to 60 minutes.

For thin wall thicknesses, of the order of about ¼ inch, for example, a hot pressing time of 15 minutes is usually adequate, although somewhat improved results may in some cases be obtained with longer treating times. At any rate, the hot pressing time should be sufficiently long so that substantially all of the part reaches and is maintained at the treating temperature for a suitble period of time. Thicker sections require more time for stabilization of the temperature therethrough.

By the end of such period of treating time, the lithium borate and alumina have been fused and sintered into a unitary mass of controlled size and shape. Moreover, the porosity of the product is preferably low enough so that it is vacuum tight. This feature is particularly important for various plasma physics applications and the like.

It should be emphasized that the hot pressing step can be carried out utilizing other equipment in substitution for the previously indicated graphite dies or boron nitride lined graphite dies. For example, dies of metal carbide, such as silicon carbide, tungsten carbide, etc., may be employed in carrying out the hot pressing operation.

After the hot pressing step is completed and the desired ceramic product is formed and shaped to the desired dimensions, the product is brought to ambient temperature. In this connection, the ceramic product can be allowed to gradually cool or can be cooled in a controlled manner by any suitable conventional means. After the ceramic product has reached a low temperature, below the temperature at which impurities which may be present in the pressing area are likely to react with the atmosphere, preferably a convenient handling temperature, for example 100° F., it is removed from the pressing means, i.e., dies or the like.

Finishing operations, if any, may then be carried out. For example, as previously described, where graphite dies are utilized, graphite from the dies is removed from the outer surface of the ceramic product, as by sanding, etc. In some applications, it is important to have as pure and clean a ceramic product as practical.

The ceramic product is then ready for use. It is shock resistant, can be utilized over a wide temperature range up to the melting point thereof, i.e., up to temperatures of about 930° C. It is relatively hard (Mohs hardness value of 7 or 8), strong and durable, and is vacuum tight, that is, relatively non-porous. In addition, it is substantially chemically inert. Moreover, the ceramic product is produced with accurately controlled dimensions, in contrast to conventionally produced high temperature ceramic products which are shaped at relatively low temperatures and then fused by firing to high temperatures, for example, 1600° C. Such cool shaping followed by hot firing produces considerable dimensional distortion, rendering the products thereof unsatisfctory for applications where size and shape must be held within small limits.

Certain features of the present invention are set forth in the following example.

*Example*

A mixture of about 90 percent by weight of alumina (200 mesh) and 10 percent by weight of lithium borate ($LiBO_2$, also 200 mesh) was prepared and hot pressed at about 800° C. and about 3600 p.s.i. in a boron nitride lined graphite die under argon gas for a period of 30 minutes to form a one-inch diameter hollow cylindrical ceramic tube. The tube was then allowed to cool within the die to room temperature (70° F.) and was removed from the die. The tube was found to be dimensionally accurate to within one 1/32 inch and had a smooth outer surface substantially free of other substances. The tube was heated to 900° C. and maintained at that temperature for an extended period of time. It was found to retain its dimensions, and to be relatively resistant to thermal shock, as well as durable and relatively non-porous.

From the example and the preceding description, it is clear that an improved method of producing high quality, high temperature ceramic products is provided. The method allows the formation of the ceramic products to take place at a sufficiently low temperature and under sufficiently stable conditions so that the dimensions of the product can be carefully and accurately controlled. Accordingly, the ceramic products are considerably improved in this and other respects over conventional high temperature ceramic products. Other advantages are as set forth in the foregoing.

Various modifications in the method of the present invention, the steps thereof, and the materials and equipment for carrying out the method, as well as in the product of the method, as are within the skill of the art are contemplated as being within the scope of the present invention.

What is claimed is the following.

I claim:

1. An improved method of fabricating high temperature ceramic products, which method includes the steps of mixing together from about 1 to about 20 percent by weight of lithium borate, calculated as $LiBO_2$ and substantially the remainder being alumina, hot pressing the resulting mixture under a vacuum or inert atmosphere at a sintering temperature below the melting point for said mixture to a final shape and size, and thereafter cooling said mixture to ambient temperature, whereby a finished ceramic product of final size and shape within small dimensional tolerances is obtained.

2. An improved method of fabricating high temperature ceramic products, which method includes the steps of mixing together from about 1 to about 20 percent by weight of lithium borate, calculated as $LiBO_2$, and substantially the remainder, from about 99 to about 80 percent by weight, being alumina, said lithium borate and said alumina being in particulate form, hot pressing the resulting mixture under a vacuum or inert atmosphere at a sintering temperature below the melting point for said mixture to a final shape and size, and thereafter cooling said mixture to ambient temperature, whereby a finished ceramic product of final shape and size within small dimensional tolerances is obtained.

3. An improved method of fabricating high temperature ceramic products, which method includes the steps of mixing together from about 1 to about 20 percent by weight of lithium borate, calculated as $LiBO_2$, and substantially the remainder, from about 99 to about 80 percent by weight, being alumina, said lithium borate and said alumina being in fine particulate form, hot pressing the resulting mixture under a vacuum or inert atmosphere at a sintering temperature below the melting point for said mixture of between about 800° C. and about 850° C. to a final shape and size, and thereafter cooling said mixture to ambient temperature, whereby a finished ceramic product of final shape and size within small dimensional tolerances is obtained.

4. An improved method of fabricating high temperature ceramic products, which method includes the steps of mixing together from about 1 to about 20 percent by weight of lithium borate, calculated as $LiBO_2$, and substantially the remainder, from about 99 to about 80 percent by weight, being alumina, said lithium borate and said alumina being in fine particulate form, hot pressing the resulting mixture under a vacuum or inert atmosphere at a sintering temperature below the melting point for said mixture of between about 800° C. and about 850° C. and under a pressure of between about 3000 and about 4000 p.s.i. to a final shape and size, and thereafter cooling said mixture to ambient temperature, whereby a finished ceramic product of final shape and size within small dimensional tolerances is obtained.

5. An improved method of fabricating high temperature ceramic products, which method includes the steps of mixing together from about 1 to about 20 percent by weight of lithium borate, calculated as $LiBO_2$, and substantially the remainder, from about 99 to about 80 percent by weight, being alumina, said lithium borate and said alumina being in fine particulate form, hot pressing the resulting mixture under a blanket of inert gas at a sintering temperature below the melting point for said mixture of between about 800° C. and about 850° C. to a final shape and size, and thereafter cooling said mixture to ambient temperature, whereby a finished ceramic product of final shape and size within small dimensional tolerances is obtained.

6. An improved method of fabricating high temperature ceramic products, which method includes the steps of mixing together from about 1 to about 20 percent by weight of lithium borate, calculated as $LiBO_2$, and substantially the remainder, from about 99 to about 80 percent by weight, being alumina, said lithium borate and said alumina being in fine particulate form, hot pressing the resulting mixture under a blanket of inert gas at a sintering temperature below the melting point for said mixture of between about 800° C. and about 850° C. and under a pressure of between about 3000 and about 4000 p.s.i. to a final shape and size, and thereafter cooling said mixture to ambient temperature, whereby a finished ceramic product of final shape and size within small dimensional tolerances is obtained.

7. An improved method of fabricating high temperature ceramic products, which method includes the steps of mixing together about 10 percent, by weight of final mixture, of lithium borate ($LiBO_2$) and about 90 percent, by weight of final mixture, of alumina, said lithium borate and said alumina being in fine particulate form, hot pressing said mixture under an argon blanket at about 800° C. and under a pressure of about 3600 p.s.i. to a final shape and size, and thereafter cooling said mixture to ambient temperature, whereby a finished dimensionally stable ceramic product is obtained.

8. An improved, dimensionally stable, high temperature ceramic product of low porosity, which consists essentially of a mixture of from about 1 to about 20 percent by weight of lithium borate, calculated as $LiBO_2$ and substantially the remainder being alumina hot pressed into final size and shape in a vacuum or inert atmosphere at a sintering temperature below the melting point for said mixture.

9. An improved, dimensionally stable, high temperature, shock resistant ceramic product of low porosity, which consists essentially of a mixture of from about 1 to 20 percent, by weight, of lithium borate, calculated as $LiBO_2$, and substantially the remainder, from about 99 to about 80 percent by weight, being alumina, said mixture having been hot pressed into final size and shape in a vacuum or inert atmosphere at a sintering temperature below the melting point for said mixture, said product being substantially gas impermeable.

10. An improved, dimensionally stable, high temperature, shock resistant ceramic product of low porosity, which consists essentially of a mixture of from about 1 to 20 percent, by weight, of lithium borate, calculated as $LiBO_2$, and substantially the remainder, from about 99 to about 80 percent by weight, being alumina, said mixture having been hot pressed from granular form at a temperature between about 800° C. and about 850° C. into final size and shape in a controlled atmosphere comprising a blanket of inert gas, said product being substantially gas impermeable.

11. An improved, dimensionally stable, high temperature, shock resistant ceramic product of low porosity, which consists essentially of a mixture of from about 1 to 20 percent, by weight, of lithium borate, calculated as $LiBO_2$, and substantially the remainder, from about 99 to about 80 percent by weight, being alumina, said mixture having been hot pressed from granular form at a temperature between about 800° C. and about 850° C. and a pressure between about 3000 and 4000 p.s.i. into final size and shape in a controlled atmosphere comprising a blanket of inert gas, said product being substantially gas impermeable.

12. An improved, dimensionally stable, high temperature, shock resistant ceramic product of low porosity, which consists essentially of a mixture of about 10 percent, by weight of final mixture, of lithium borate, $LiBO_2$, and about 90 percent, by weight of final mixture, of alumina hot pressed at about 800° C. and at a pressure of about 3600 p.s.i. under an argon blanket into a dimensionally stable final shape and size, said product being substantially gas impermeable.

References Cited in the file of this patent

UNITED STATES PATENTS

| | | |
|---|---|---|
| 2,087,066 | Nadler | July 13, 1937 |
| 2,399,225 | Heany | Apr. 20, 1946 |
| 2,730,439 | Houchins | Jan. 10, 1956 |